(12) United States Patent
Cain, III et al.

(10) Patent No.: US 9,928,158 B2
(45) Date of Patent: *Mar. 27, 2018

(54) REDUNDANT TRANSACTIONS FOR DETECTION OF TIMING SENSITIVE ERRORS

(71) Applicant: International Business Machines Corporation, Armonk, NY (US)

(72) Inventors: Harold W. Cain, III, Katonah, NY (US); David M. Daly, Croton-on-Hudson, NY (US); Michael C. Huang, Rochester, NY (US); Kattamuri Ekanadham, Mohegan Lake, NY (US); Jose E. Moreira, Irvington, NY (US); Mauricio J. Serrano, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/011,557

(22) Filed: Jan. 30, 2016

(65) Prior Publication Data

US 2016/0147639 A1    May 26, 2016

Related U.S. Application Data

(63) Continuation of application No. 13/962,720, filed on Aug. 8, 2013, now Pat. No. 9,251,014.

(51) Int. Cl.
*G06F 11/00* (2006.01)
*G06F 11/36* (2006.01)
*G06F 11/14* (2006.01)

(52) U.S. Cl.
CPC ...... *G06F 11/3636* (2013.01); *G06F 11/1474* (2013.01); *G06F 11/1492* (2013.01);
(Continued)

(58) Field of Classification Search
CPC ............. G06F 11/1497; G06F 11/3636; G06F 11/3648; G06F 11/3668
See application file for complete search history.

(56) References Cited

U.S. PATENT DOCUMENTS 7,861,228 B2    12/2010   Osecky et al.
2001/0034824 A1   10/2001   Mukherjee et al.
(Continued)

OTHER PUBLICATIONS

Huan-Yu Tu, Simulation of Fault Effect on Redundant Multi-Threading Execution, Proceedings of the World Congress on Engineering and Computer Science 2008, Oct. 22-24, 2008, IAENG, San Francisco, USA.
(Continued)

*Primary Examiner* — Joshua P Lottich
(74) *Attorney, Agent, or Firm* — Daniel P. Morris; Otterstedt, Ellenbogen & Kammer, LLP

(57) ABSTRACT

A method for detecting a software-race condition in a program includes copying a state of a transaction of the program from a first core of a multi-core processor to at least one additional core of the multi-core processor, running the transaction, redundantly, on the first core and the at least one additional core given the state, outputting a result of the first core and the at least one additional core, and detecting a difference in the results between the first core and the at least one additional core, wherein the difference indicates the software-race condition.

3 Claims, 3 Drawing Sheets

(52) U.S. Cl.
CPC ........ *G06F 11/1497* (2013.01); *G06F 11/362* (2013.01); *G06F 11/3648* (2013.01); *G06F 11/3668* (2013.01); *G06F 2201/865* (2013.01); *G06F 2201/87* (2013.01)

(56) References Cited

U.S. PATENT DOCUMENTS

| | | | |
|---|---|---|---|
| 2005/0050386 A1* | 3/2005 | Reinhardt | G06F 11/1482 714/13 |
| 2005/0193283 A1 | 9/2005 | Reinhardt et al. | |
| 2005/0223178 A1 | 10/2005 | Garcia et al. | |
| 2006/0200823 A1 | 9/2006 | Rodeheffer et al. | |
| 2008/0016393 A1 | 1/2008 | Bose et al. | |
| 2009/0113240 A1* | 4/2009 | Vera | G06F 11/008 714/17 |
| 2009/0177872 A1* | 7/2009 | Weiberle | G06F 9/4812 712/229 |
| 2011/0047364 A1 | 2/2011 | Koju et al. | |
| 2011/0175643 A1 | 7/2011 | Bogenberger et al. | |
| 2012/0011492 A1 | 1/2012 | Sinha et al. | |
| 2012/0210162 A1* | 8/2012 | Gara | G06F 11/1064 714/6.1 |
| 2013/0254592 A1 | 9/2013 | Yamada et al. | |
| 2015/0046752 A1 | 2/2015 | Cain, III et al. | |
| 2015/0046758 A1 | 2/2015 | Cain, III et al. | |
| 2015/0234661 A1* | 8/2015 | Yamada | G06F 9/30145 712/227 |

OTHER PUBLICATIONS

Shantanu Gupte et al., Using Hardware Transactional Memory for Data Race Detection, in Parallel & Distributed Processing, 2009. IPDPS May 2009, pp. 1-11.

* cited by examiner

REDUNDANT TRANSACTIONS FOR DETECTION OF TIMING SENSITIVE ERRORS

CROSS-REFERENCE TO RELATED APPLICATIONS

This application is a continuation of U.S. patent application Ser. No. 13/962,720 filed Aug. 8, 2013, the complete disclosure of which is expressly incorporated herein by reference in its entirety for all purposes.

BACKGROUND

The present disclosure relates generally to the software arts, and more particularly, methods for using a redundant transaction infrastructure to detect certain behavior.

Software-race conditions, which can lead to erroneous processing, often exist in multi-threaded programs on multi-processor systems. The software-race conditions can be caused by errors or flaws in code (typically referred to as bugs). In multi-threaded programs, these bugs can be timing sensitive; that is, an output of the code can be dependent on a sequence or timing of other events. Timing sensitive errors may be particularly difficult to detect since the code can exhibit different behavior under different conditions, such as when being debugged.

BRIEF SUMMARY

According to an embodiment of the present disclosure, a method for detecting a software-race condition in a program includes copying a state of a transaction of the program from a first core of a multi-core processor to at least one additional core of the multi-core processor, running the transaction, redundantly, on the first core and the at least one additional core given the state, outputting a result of the first core and the at least one additional core, and detecting a difference in the results between the first core and the at least one additional core, wherein the difference indicates the software-race condition.

According to an embodiment of the present disclosure, a method for detecting code responsible for a software-race condition includes copying a state of a transaction of a program from a first thread to at least one additional thread, running the transaction, redundantly, on the first thread and the at least one additional thread given the state, outputting a result of the first thread and the at least one additional thread, wherein at least two threads are run with different timing, and detecting a difference in the results between the first thread and the at least one additional thread, wherein the difference indicates the software-race condition.

According to an embodiment of the present disclosure, a system for detecting code responsible for a software-race condition in multithreaded software includes a redundant transaction hardware configured to run a transaction of the multithreaded software redundantly and detect different executions between redundant executions of the transaction, and a module configured to set different delays for the different executions.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a system can include a redundant transactional memory, which can be used for backward differentiation to track coherence states of accessed memory through program execution. The coherence states can be rechecked at a later time, and an alternative execution can be triggered when a changed in state is detected.

Embodiments of the present disclosure relate to a redundant transaction infrastructure for detecting certain behavior (e.g., software-race conditions) in a system executing a routine. For example, in an exemplary context of software debugging, a software-race condition can be automatically detected and isolated, reducing debugging time for a developer.

Generally, a transaction is a code sequence that takes a state of a system from an initial state $S_i$ to another (e.g., final) state $S_f$. Redundant transactions run the same piece of code in two places. More particularly, redundant transactions can be executed by two or more agents taking the initial state $S_i$ to a plurality of final states $S_f^0, S_f^1, S_f^2, \square, S_f^n$, one final state for each execution.

Redundant transactions can be used in a verity of applications based on the use of the final states. For example, redundant transactions (e.g., w log, running on two engines) that only commit if $S_f^0 = S_f^1$ can be used for achieving high-reliability. In another example, redundant transactions (e.g., w log, running on two engines) that commit one of the states ($S_f^0$) and publishes the difference between $S_f^0$ and $S_f^1$ can be used for software-race detection.

Figure 1:
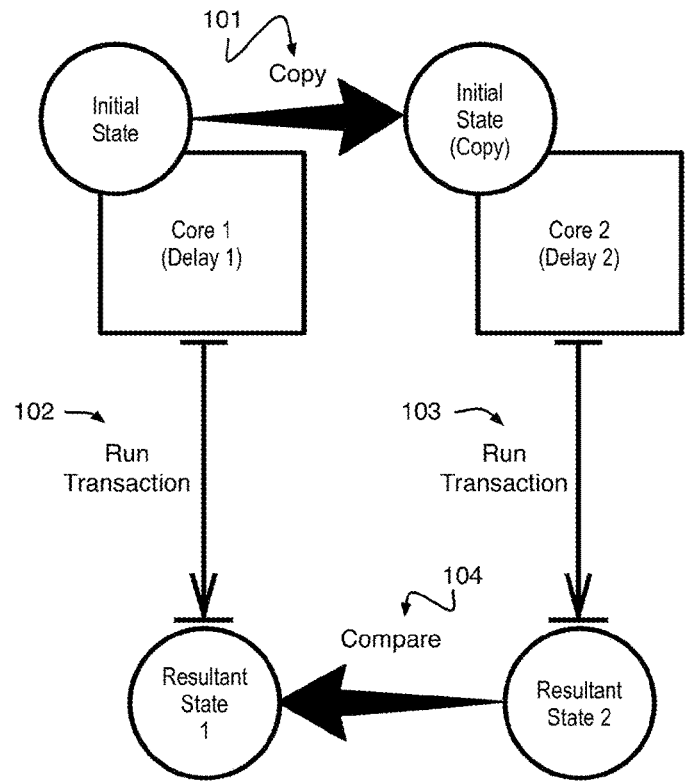
FIG. 1 is a diagram of a redundant transaction for software-race condition detection according to an exemplary embodiment of the present disclosure.
Figure 2:
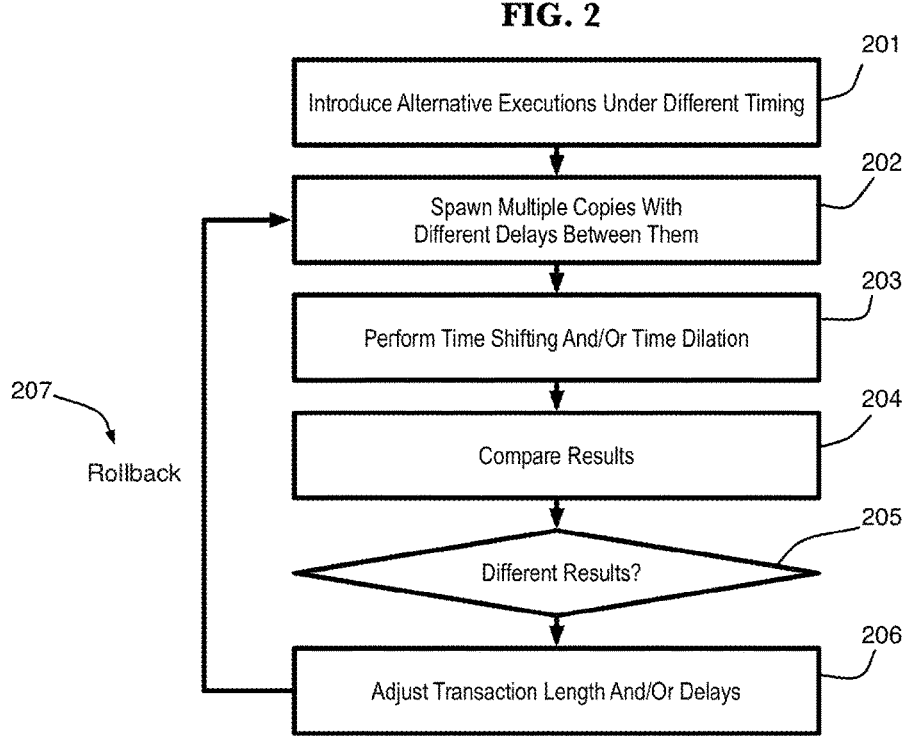
FIG. 2 is a flow diagram of a redundant transaction for software-race condition detection according to an exemplary embodiment of the present disclosure.

Referring to FIG. 1, given redundant transactions running the same piece of code in two or more places, the results of each of the runs can be compared. In this context, a checkpoint can be implemented, which includes copying a state to a second core or thread (101), running the transaction on both cores/threads given the state using different delays for each core/thread (102, 103), and comparing the results (104).

Upon determining differences in the output of the cores/threads based on the comparison of the results, the system can take various actions. For example, a rollback operation can be performed for error correction (e.g., upon determining a difference between the results of the different copies of the transaction) or the results of one of the copies of the transaction can be committed and the difference between the results of the copies of the transaction can be logged.

It should be understood that the state includes values stored in registers in a register file, and values of speculative stores to memory (e.g., memory used to store speculatively updated results). If there is no software-race condition, and correct execution has occurred, the register files and the speculative stores have identical contents as a result of the redundant executions, otherwise the register files and the speculative stores can be expected to include different results.

Turning now to exemplary applications of a comparison result: according to an exemplary embodiment of the present disclosure, a software debug method includes software-race detection. The exemplary method can include introducing alternative executions of a transaction under different timing (201), spawning multiple copies of the transaction (202) and performing a time shifting and/or time dilation method to produce variable delays between the copies of the transaction (203). The different timing can be considered as a variable stress on the system, which can expose software-race conditions. Upon comparison of the results at block 204, different results can indicate a software-race condition (205).

In the case where a software-race condition is detected in a segment of code, a transaction length can be shortened to narrow the segments of code being monitored or a delay can be adjusted (206).

In one exemplary embodiment, a program can be broken into a plurality of transactions. These transactions can be tied to the original source code of the program or the instruction binary. When a transaction fails, it can be replaced with one or more smaller transactions (broken into smaller transactions). At some point, the transactions can become too small to expose the software-race condition. At this point, the system can report the smallest transaction that exposes the software-race condition.

As the software-race conditions are timing sensitive, and sensitive to other processes in the system, the application can continue running and failing transaction can be examined one or more times at a later time. In another exemplary embodiment, a rollback (207) can be performed followed by a re-execution of the failing transaction, now replaced by a plurality of smaller transaction. In one exemplary embodiment, an entire system can be rolled back.

According to an exemplary embodiment of the present disclosure, a shifting delay (206) includes the setup of a countdown counter (e.g., in software). In the case of shifting delay, a copy/thread will not start until the counter reaches zero (or some other predetermined indicia).

According to an exemplary embodiment of the present disclosure, in the case of a dilation type delay (206), a delay can be applied to one or more copies/threads, for example, using fetch throttling to slow the one or more threads. For example, the system can throttle or reduce the fetching of instructions for a copy of the transaction.

It should be understood that there are multiple ways to slow the execution of a processor. For example, dilation or fetch throttling and time shifting can be used. Dilation changes the clock rate of the processor, limiting any resource of the processor. Time shifting the execution of a processor by putting in a long delay somewhere in the execution, but otherwise running at the normal speed can be used. There are a number of mechanisms to implement either of these exemplary effects.

In the case of dilation delay, a random delay can be inserted after a subset of instructions/event, for example, after a load/store or cache miss or every $n^{th}$ occurrence. The occurrence refers to the subset of events or instructions. Examples include, delay insertion after executing ten instructions, after every third load to memory, after every second floating point operation, after every branch misprediction, etc.

Figure 3:
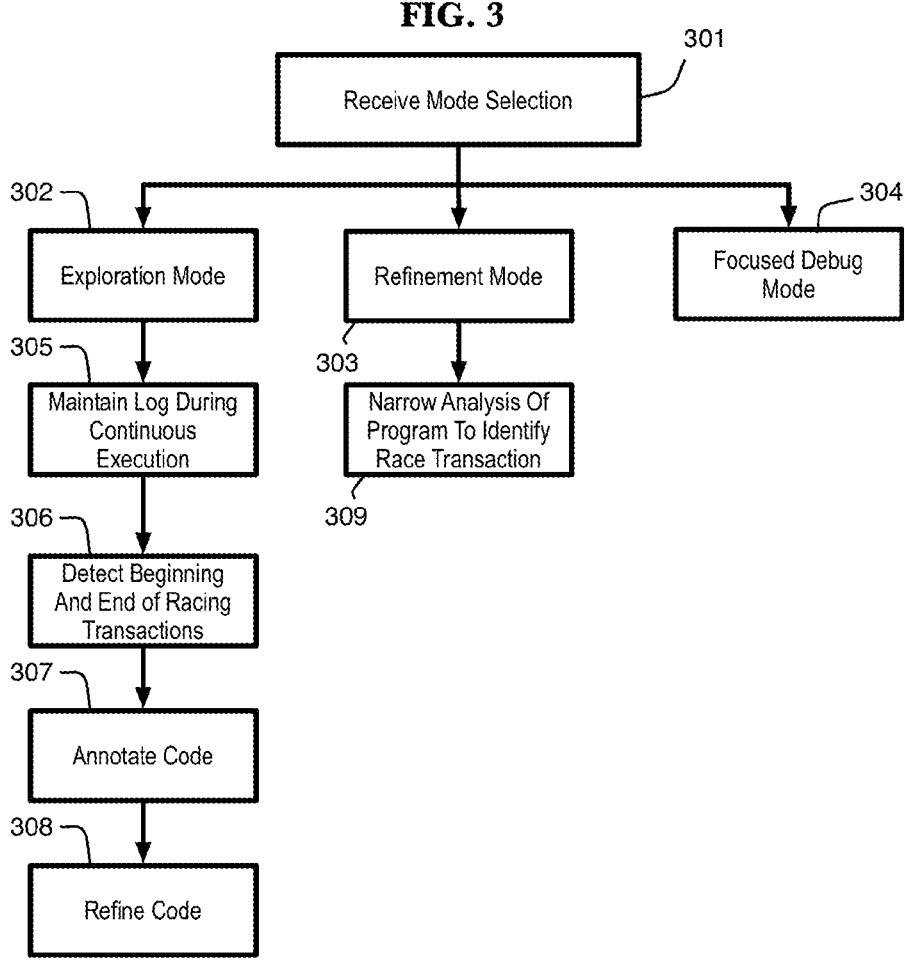
FIG. 3 is a flow diagram of modes of a redundant transaction according to an exemplary embodiment of the present disclosure.

According to an exemplary embodiment of the present disclosure, a system can be run in different modes. Referring to FIG. 3, the system can be operated in an exploration mode, a refinement mode, or a focused debug mode (301).

In the exploration mode (302), a log is maintained as differences are detected while continuously executing one or more transactions with difference detection (305). The log can include the start and end addresses of the transaction. The log can also include information such as register state at the start of the transaction, the time when the difference was detected, an indication of a path in the program control flow (e.g., the same instructions can be used in multiple paths through the control flow), for example, if the code represents a function call, the function may be called from multiple places in the code. The program maintains a stack that includes control flow information. For example, if a main thread of the program calls function A, which calls function B, which calls function C, and an error in function C can be determined, the call stack at that time would be B,A,Main, with an indication of where in B the program was when it called C, and where in A it was when it called B, and so on.

One goal of the exploration mode can be to detect as many software-races as possible. More particularly, in the exploration mode, a beginning and end program counter (PC) of racing transactions can be found (306), wherein the source code can be automatically annotated (307). The PC indicates the address of the instruction currently executing. At block 308, the annotated source code can be reviewed and refined (e.g., by a user), wherein control devices, such as pragmas or directives, can be added to the source code (309) to control actions of a compiler in a particular portion of a program without affecting the program as a whole. Exemplary pragmas include, for example, "Known_Race_Begin," "Known_Race_End," "Target_Region_Begin" and "Target_Region_End."

In the refinement mode (303), potential software-race regions can be automatically narrowed to one or more focused software-races (309). For example, the focused software-race can be in a target region. The initial software-race may be detected in a sequence of 1000 instructions. In the refinement mode, attempts are made to detect the software-race using smaller sequences of instructions, for example one hundred instructions. Recall that the program can be defined as a graph made up of blocks of code and control flow. The search can control a flow graph to narrow (e.g., minimize) the number of instructions defining a failing region, that is a region including the rate. The narrowing can be performed by, for example, a probabilistic binary search of the source code.

In the focused debug method (304), a particular software-race can be tracked and stopped upon detection of a difference between transactions. In this case, the failure is narrowed to a small region, and the user wants to debug a failing case. The system attempts to obtain a specific failing case to fail, and the user can roll back and execute the failing case using a debugger.

According to an exemplary embodiment of the present disclosure, redundant transactional memory can be used for targeted differentiation wherein certain locations in the source code can be monitored and access can be delayed until a state change or time out occurs.

According to an exemplary embodiment of the present disclosure, in a system on which a plurality of threads of execution are running redundantly, a delay can be added on a path of a corresponding thread to stress system. A difference in execution between the threads can indicate a software-race condition.

According to an exemplary embodiment of the present disclosure, a method for detecting a software-race condition, code can be run redundantly with variable delays inserted between redundant copies of the code. Upon detecting a different execution race, a transaction length and delay can be adjusted to reduce the software-race condition.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a system (e.g., a multi-core system according to FIG. 1) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module for copying a state from a first core/thread to one or more second cores/threads, at least one second module for running the transaction on the cores/threads given the state, a third module for comparing the results of each core/thread, and a fourth module for altering the timing of the transactions to identify code responsible for a software-race condition.

Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
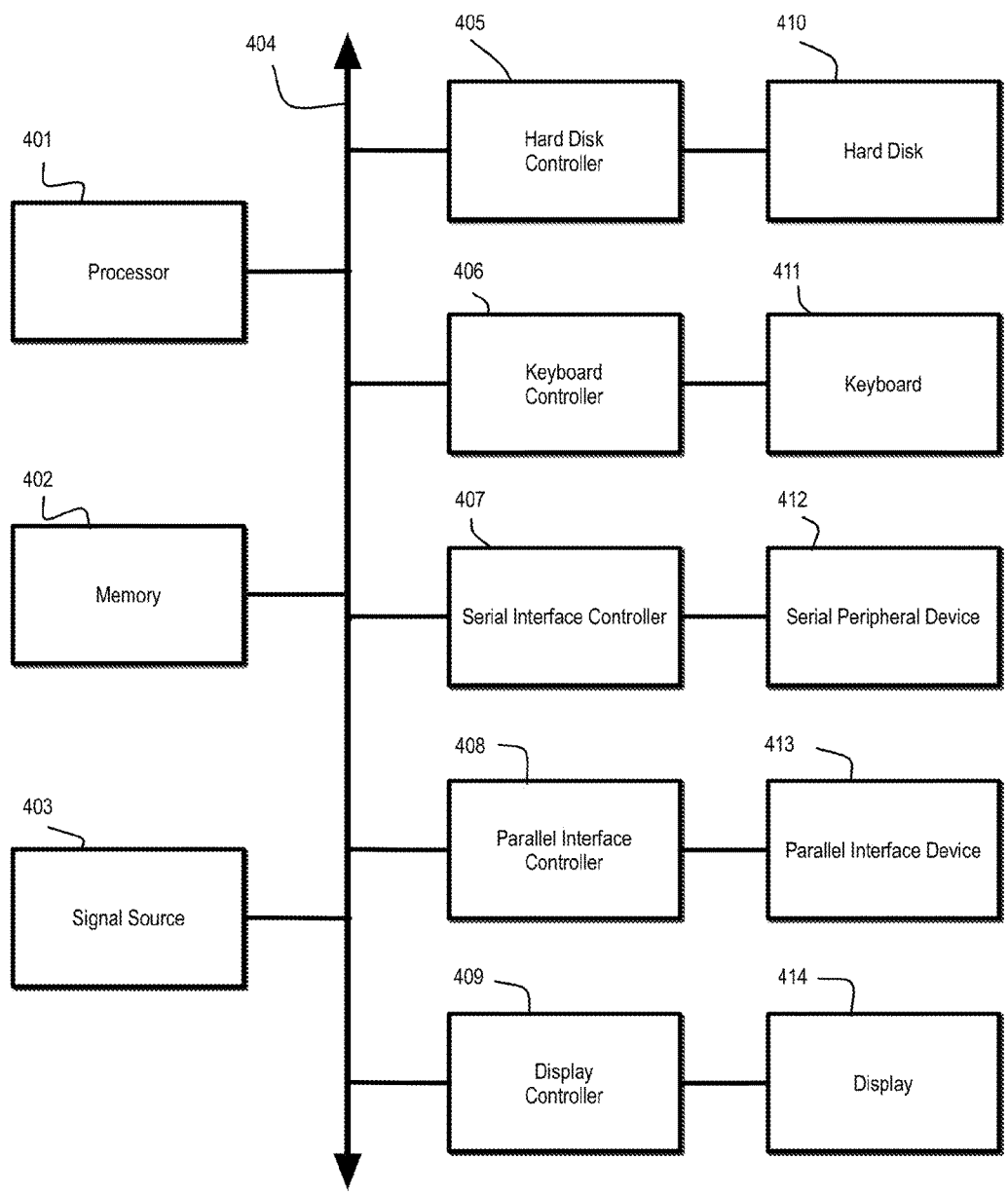
FIG. 4 is a block diagram depicting an exemplary computer system for performing redundant transactions for software-race condition detection according to an embodiment of the present disclosure.

For example, FIG. 4 is a block diagram depicting an exemplary computer system for using redundant transactions for detecting software-race conditions according to an embodiment of the present disclosure. The computer system shown in FIG. 4 includes a processor 401, memory 402, signal source 403, system bus 404, Hard Drive (HD) controller 405, keyboard controller 406, serial interface controller 407, parallel interface controller 408, display controller 409, hard disk 410, keyboard 411, serial peripheral device 412, parallel peripheral device 413, and display 414.

In these components, the processor 401, memory 402, signal source 403, HD controller 405, keyboard controller 406, serial interface controller 407, parallel interface controller 408, display controller 409 are connected to the system bus 404. The hard disk 410 is connected to the HD controller 405. The keyboard 411 is connected to the keyboard controller 406. The serial peripheral device 412 is connected to the serial interface controller 407. The parallel peripheral device 413 is connected to the parallel interface controller 408. The display 414 is connected to the display controller 409.

In different applications, some of the components shown in FIG. 4 can be omitted. The whole system shown in FIG. 4 is controlled by computer readable instructions, which are generally stored in the hard disk 410, EPROM or other non-volatile storage such as software. The software can be downloaded from a network (not shown in the figures), stored in the hard disk 410. Alternatively, a software downloaded from a network can be loaded into the memory 402 and executed by the processor 401 so as to complete the function determined by the software.

The processor 401 may be configured to perform one or more methodologies described in the present disclosure, illustrative embodiments of which are shown in the above figures and described herein. Embodiments of the present disclosure can be implemented as a routine that is stored in memory 402 and executed by the processor 401 to process the signal from the signal source 403. As such, the computer system is a general-purpose computer system that becomes a specific purpose computer system when executing the routine of the present disclosure.

Although the computer system described in FIG. 4 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method for detecting a software-race condition in a program, the method comprising:
   copying a state of a transaction of the program from a first core of a multi-core processor to at least one additional core of the multi-core processor;
   running the transaction, redundantly, on the first core and the at least one additional core given the state, wherein the transaction is run by at least one of the first core and the at least one additional core with a shifting delay starting the transaction at different times on the first core and the at least one additional core;
   outputting a result of the first core and the at least one additional core;
   detecting a difference in the results between the first core and the at least one additional core, wherein the difference indicates the software-race condition;
   maintaining a log of the difference detected while continuously executing the transaction, wherein the log includes start and end addresses of the transaction;
   obtaining a failing case based on the software-race condition;
   performing a rollback of the program; and
   executing the failing case using a debugger.

2. A non-transitory computer readable medium comprising computer executable instructions which when executed by a computer cause the computer to perform a method for detecting a software-race condition in a program, the method comprising:
   copying a state of a transaction of the program from a first core of a multi-core processor to at least one additional core of the multi-core processor;
   running the transaction, redundantly, on the first core and the at least one additional core given the state, wherein the transaction is run by at least one of the first core and the at least one additional core with a shifting delay starting the transaction at different times on the first core and the at least one additional core;
   outputting a result of the first core and the at least one additional core;
   detecting a difference in the results between the first core and the at least one additional core, wherein the difference indicates the software-race condition;
   maintaining a log of the difference detected while continuously executing the transaction, wherein the log includes start and end addresses of the transaction;
   obtaining a failing case based on the software-race condition;
   performing a rollback of the program; and
   executing the failing case using a debugger.

3. An apparatus for detecting a software-race condition in a program, the apparatus comprising:
   a multi-core processor having at least first and second cores; and
   a memory coupled to said multi-core processor;
   wherein said multi-core processor and said memory are cooperatively configured to:
   copy a state of a transaction of the program from said first core to at least said second core;
   run the transaction, redundantly, on the first core and the at least second core given the state, wherein the transaction is run by at least one of the first core and the at least second core with a shifting delay starting the transaction at different times on the first core and the at least second core;
   output a result of the first core and the at least second core;
   detect a difference in the results between the first core and the at least second core, wherein the difference indicates the software-race condition;
   maintain a log of the difference detected while continuously executing the transaction, wherein the log includes start and end addresses of the transaction;
   obtain a failing case based on the software-race condition;
   perform a rollback of the program; and
   execute the failing case using a debugger.

* * * * *